F. A. DOYLE.
WHEEL RIM.
APPLICATION FILED JAN. 7, 1916.
1,249,922.
Patented Dec. 11, 1917.
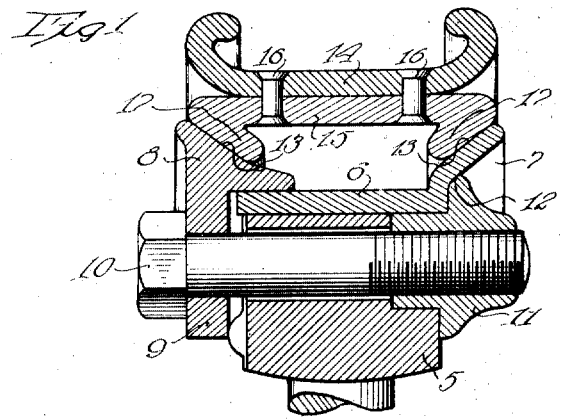
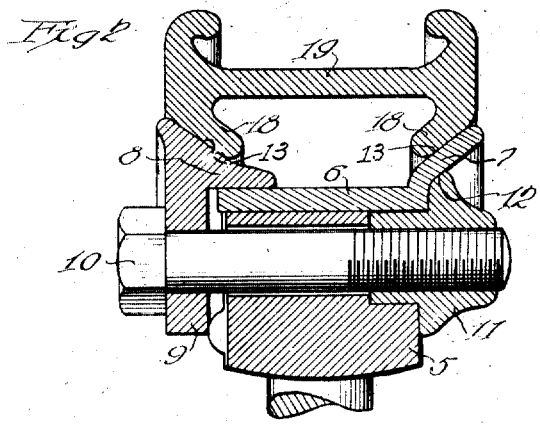
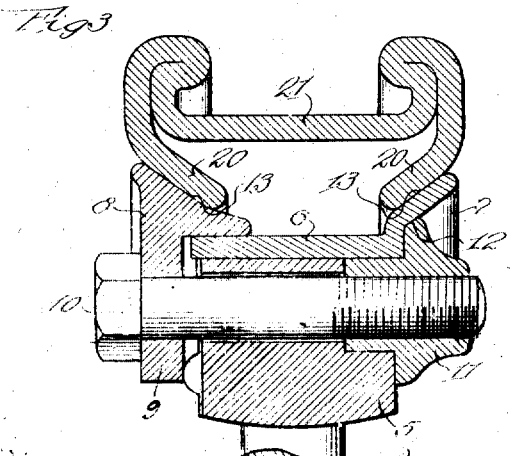
Inventor:
Francis A. Doyle

UNITED STATES PATENT OFFICE.

FRANCIS A. DOYLE, OF CHICAGO, ILLINOIS.

WHEEL-RIM.

1,249,922.  Specification of Letters Patent.  Patented Dec. 11, 1917.

Application filed January 7, 1916.  Serial No. 70,754.

*To all whom it may concern:*

Be it known that I, FRANCIS A. DOYLE, a citizen of the United States, residing at Chicago, in the county of Cook and State of Illinois, have invented certain new and useful Improvements in Wheel-Rims, of which the following is a specification.

My invention relates to rims for securing rubber tires and the like, on vehicle wheels, and has for its object, the provision of a simple and efficient rim of the character mentioned, adapted to secure a tire to a wheel, where tire and wheel are of sizes different than that intended to be used together. Other objects will appear hereinafter.

An embodiment of my invention is shown in the accompanying drawing, forming a part of this specification and in which—

Figures 1, 2, and 3, are transverse sections taken through a felly, felly band and tire rim, embodying my invention. In each of the three figures, the adapting means between the flanges of the felly band and tire rim, is slightly modified from the other figures.

In many vehicles, and particularly automobiles, the tires on the front wheels are smaller than the tires on the rear wheels. For instance, some automobiles have tires thirty inches in diameter and three inches in thickness on their front wheels and thirty inches in diameter and three and one-half inches in thickness on their rear wheels. This arrangement necessitates two different sizes of wheels, the rear wheels being slightly smaller than the front wheels.

My invention has to do with providing means for filling in the space between a rim and tire on the smaller wheel. It often happens that wheels of the same size are used all around on a vehicle, such as an automobile, and tires of smaller thickness used on the front wheels. When this is done, it is necessary to provide means for filling in the space between the rims holding the tires of the front wheels and the felly bands of said wheels. My invention applies to this latter condition also. The improvement may also be applied when it is desired to use larger tires on a wheel than that ordinarily intended to be used on such wheel.

Referring more particularly to the drawing, in each of the figures I have shown a section through a felly, felly band and tire rim of a vehicle wheel, such as an automobile wheel. In each figure, the felly 5, is provided with a felly band 6, shrunk onto the wood felly 5, in the usual manner well known in the wheel making art. At one of the edges of the felly band 6, is an integral flange 7, which is adapted to assist in holding the tire rim in position on the wheel. At the other edge of the felly band 6, is a detachable flange 8, which is adapted to coöperate with the flange 7, to hold the tire rim in position on the wheel. The flange 8, is provided with ears 9, one of which is shown. The ear 9, is perforated and a bolt 10, passed therethrough and through the felly 5, and threaded in a nut 11, as clearly indicated. The nut 11, is preferably provided with a shoulder 12, to prevent its turning when the bolt is turned to adjust the flange 8 to its operative position, or when it is loosened from its operative position.

The rim holding surfaces 13, of the flanges 7 and 8, are preferably conical and tapering toward each other, to provide means for holding the tire rim between the flanges, as clearly indicated. The parts already specifically described, are old and well known in the automobile wheel manufacturing art, and no claim is made herein thereto.

My invention consists in providing means adapted to engage the flanges 7 and 8, and position the tire rim 14 concentric with the felly band. In Fig. 1, the tire rim 14, is the conventional clencher rim, having an annular band 15 secured thereto by means of rivets 16, two only being shown. At each edge of the band 15, is an adapting member 17, preferably integrally with the band 15, and shaped to fit the surfaces 13, of the flanges 7 and 8. In Fig. 2, the flange engaging adapting members 18, which correspond to the members 17, shown in Fig. 1, are formed integrally with the tire rim 19. In this form, the adapting members 18 and tire rim 19, are easily rolled from a single piece of metal. In Fig. 3, the flange engaging adapting members 20, are edge portions of the tire rim 21, which have been turned back and rolled around on the inside of the tire rim, as clearly indicated in this figure. In this form, the tire rim 21 and adapting members 20, are all formed from a single piece of sheet metal.

While I have illustrated and described the preferred form of construction of my invention, I do not desire to be limited to the precise details set forth, but, desire to avail myself of such variations and changes as come within the scope of the appended claims.

I claim:—

1. A demountable rim for vehicle wheels comprising a ring shaped in cross-section similar to the cross section of an I-beam, the stem portion of the I forming a circumferential tire rim, the outer portions of the cross bars of the I forming tire-clamping flanges and the inner portions of the cross bars forming bearing surfaces by means of which the rim is clamped to the wheel.

2. In combination, a tire rim for vehicle wheels comprising a main web portion and integral cross webs at each edge of said main web portion, the outer edges of said cross webs being shaped to engage a pneumatic tire and the inner edges of said cross webs being bent inwardly to form beveled surfaces by means of which said rim may be clamped to a vehicle wheel.

3. In combination, a vehicle wheel, a felly rim surrounding said wheel and having relatively movable outwardly inclined flanges extending from opposite edges of the periphery thereof, a detachable rim for increasing the diameter of said wheel, said rim comprising a main web arranged to extend around said wheel, cross webs at the lateral edges of said main web and forming with said main web a rim having a cross-sectional shape like the cross-section of an I-beam, the outer edges of said cross webs being shaped to engage a tire to hold it in place on said detachable rim and the inner edges of said cross webs having their outer surfaces beveled inwardly to fit between the beveled edges of the flanges on said felly rim and to space said tire rim outwardly away from said felly rim.

In testimony whereof I have signed my name to this specification, in the presence of two subscribing witnes    on this 4th day of January A. D. 1916.

FRANCIS A. DOYLE.

Witnesses:
THOMAS COLSON,
A. L. SPRINKLE.